(12) United States Patent
Kojima et al.

(10) Patent No.: US 6,719,813 B2
(45) Date of Patent: Apr. 13, 2004

(54) SOLID ELECTROLYTIC CAPACITOR AND ITS MANUFACTURING METHOD

(75) Inventors: Toshikuni Kojima, Uji (JP); Kenji Kuranuki, Muko (JP); Kazuo Tadanobu, Uji (JP); Takuhisa Sugimoto, Kyoto (JP); Yasuhiro Kobatake, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 12 days.

(21) Appl. No.: 10/173,572

(22) Filed: Jun. 18, 2002

(65) Prior Publication Data

US 2003/0007311 A1 Jan. 9, 2003

(30) Foreign Application Priority Data

Jun. 21, 2001 (JP) .................. 2001-187713

(51) Int. Cl.[7] .............. H01G 9/00; H01G 2/10; H01G 4/228
(52) U.S. Cl. .............. 29/25.03; 361/523; 361/528; 361/535; 361/540
(58) Field of Search .............. 29/25.01–25.03; 361/523–526, 528, 531, 535, 538, 540

(56) References Cited

U.S. PATENT DOCUMENTS

| | | | |
|---|---|---|---|
| 4,520,430 A | * | 5/1985 | Long et al. |
| 5,019,949 A | * | 5/1991 | Ikeda et al. |
| 5,168,434 A | * | 12/1992 | Kobayashi |
| 5,198,967 A | * | 3/1993 | Kuranuki et al. |
| 6,229,687 B1 | * | 5/2001 | Wada et al. |
| 6,293,974 B1 | * | 9/2001 | Kobatake et al. |

* cited by examiner

*Primary Examiner*—Ha Tran Nguyen
(74) *Attorney, Agent, or Firm*—Parkhurst & Wendel, L.L.P.

(57) ABSTRACT

A solid electrolytic capacitor having (A) a capacitor element including an oxide layer 1 formed on a part of an outer surface of a valve metal anode body, a solid electrolyte layer 2 formed on the oxide layer layer, and a cathode conductor layer 3 formed on the solid electrolyte layer, and an anode lead out area on a remaining part of the anode body, (B) lead terminals connected to the cathode and the anode lead out area of the capacitor element, and (C) a packaging resin encapsulating the capacitor element with parts of the lead terminals exposed outside. The solid electrolytic capacitor has a first separation strip 6 and a second separation strip 7 formed on a part of the roughened surface layer and also has insulating material 8 on the respective surfaces of the first and the second separation strips.

9 Claims, 2 Drawing Sheets

US 6,719,813 B2

SOLID ELECTROLYTIC CAPACITOR AND ITS MANUFACTURING METHOD

FIELD OF THE INVENTION

The present invention relates to a solid electrolytic capacitor provided with a solid electrolyte layer formed of a conductive polymer, and its manufacturing method.

BACKGROUND OF THE INVENTION

FIG. 2 shows a cross-sectional view of a prior art solid electrolytic capacitor. It is to be noted that a thickness of each of respective layers in FIG. 1 and FIG. 2 is exaggerated for the purposes of illustration.

In FIG. 2, valve metal 13 provided with a roughened surface layer 14 formed by an etching process is divided into an anode lead out area 12 and a capacitor element area 11 by means of a resist 19 applied onto the roughened surface layer 14.

The capacitor element area 11 is formed on a surface of the roughened surface layer 14 first by depositing dielectric oxide layer 15 by anodization and then a solid electrolyte layer 16, a carbon layer 17 and a silver paint layer 18 in succession. A lead terminal (not shown in FIG. 2) is connected to the anode lead out area 12 and the capacitor element area 11, respectively, thus completing a capacitor element. Then, the entire capacitor element is encapsulated in a packaging resin by resin molding.

It is known that there are a method of electrolytic oxidation polymerization and a method of chemical oxidation polymerization in forming the solid electrolyte layer 16. When the method of electrolytic oxidation polymerization is employed, a manganese dioxide layer is formed in advance on the dielectric oxide layer 15 and the solid electrolyte layer 16 is deposited on the manganese dioxide layer. When the method of chemical oxidation polymerization is employed, the solid electrolyte layer 16 is formed directly on the dielectric oxide layer 15.

With a solid electrolytic capacitor as shown in FIG. 2, valve metal 13 provided with roughened surface layer 14 is divided into an anode lead out area 12 and a capacitor element area 11 by a resist 19. However, solid electrolyte layer 16 is likely to creep to the anode lead out area 12 from the capacitor element area 11 through gaps between the resist 19 and the roughened surface layer 14, often resulting in causing defective insulation or an electrical break-down.

In order to address the problem, such attempts as increasing the pattern width of resist 19, adopting a material having good adhesion to the valve metal 13 and the like have been made. However, it is not easy to obtain good results for many production lots and achieving a low defective insulation rate constantly, and it has been a big problem in view of costs.

The present invention aims to address the foregoing problem and to provide a solid electrolytic capacitor and its manufacturing method, in which the probability of the conductive polymer layer to reach the anode lead out area and cause defective insulation or an electrical breakdown is remarkably reduced. In addition, the present invention provides a solid electrolytic capacitor and its manufacturing method, which do not worsen a good productivity so far enjoyed, while solving the foregoing problem.

SUMMARY OF THE INVENTION

A solid electrolytic capacitor of the present invention comprises:

(A) a capacitor element comprising:
- a dielectric oxide layer formed on a roughened surface layer on a part of an outer surface of an anode body made of a valve metal;
- a solid electrolyte layer formed on the dielectric oxide layer;
- a cathode formed of a conductor layer disposed on the solid electrolyte layer, and
- an anode lead out area on a remaining part of the outer surface of the anode body;

(B) lead terminals connected to the cathode and the anode lead out area of the capacitor element; and (C) a packaging resin encapsulating the capacitor element with parts of the respective lead terminals exposed outside.

The solid electrolytic capacitor of the present invention is characterized in having a first separation strip and a second separation strip formed on a part of the roughened surface layer and also having an insulating material applied onto the respective surfaces of the first and second separation strips. According to the present invention, a solid electrolyte layer does not extend to the anode lead out area to cause defective insulation, thereby allowing the probability of an electrical breakdown to be reduced remarkably. Moreover, the present invention does not require the use of special jigs and processes and provides a solid electrolytic capacitor without worsening the productivity so far enjoyed.

DESCRIPTION OF PREFERRED EMBODIMENTS

Figure 1A:
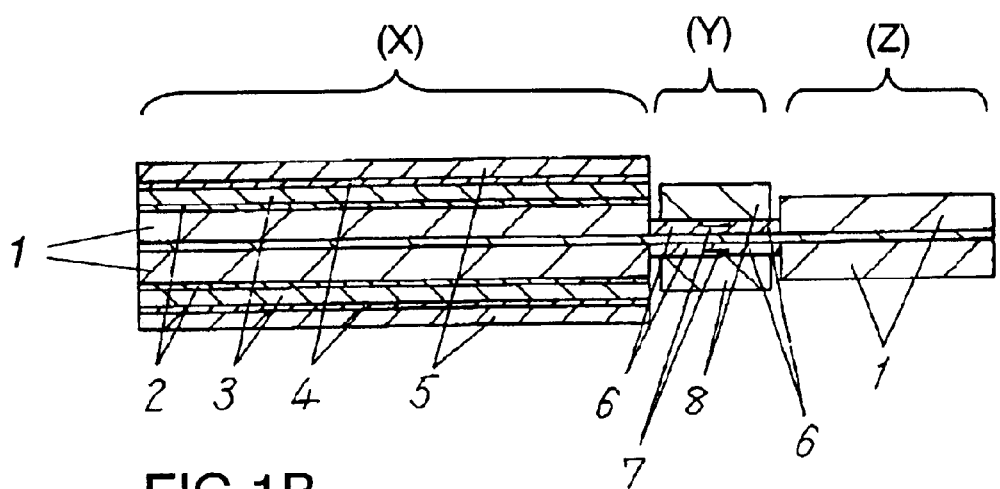
FIG. 1A is a cross-sectional view of a capacitor element of an aluminum electrolytic capacitor in an exemplary embodiment of the present invention.
Figure 1B:
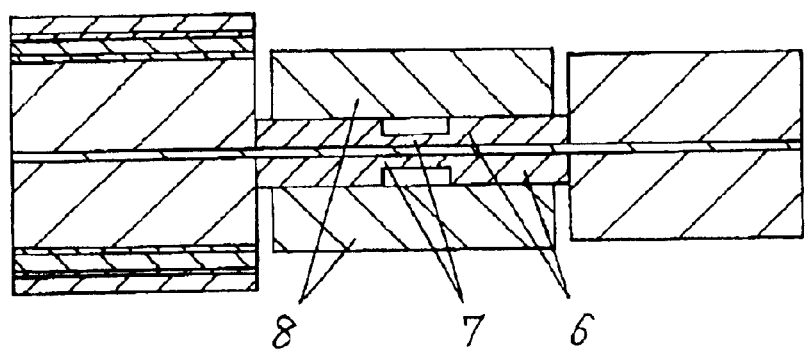
FIG. 1B is a partially enlarged cross-sectional view of separation strips of the capacitor element.
Figure 2:
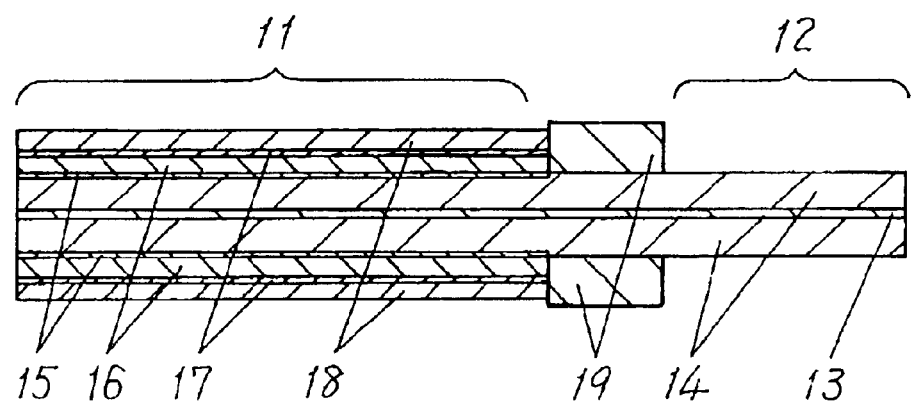
FIG. 2 is a cross-sectional view of a capacitor element of a prior art solid electrolytic capacitor.

In the following, preferred embodiments of the present invention are described with reference to the drawings.
First Exemplary Embodiment FIG. 1 shows how the a capacitor element of an aluminum solid electrolytic capacitor in the first exemplary embodiment of the present invention is structured. FIG. 1A is a cross-sectional view of the capacitor element and FIG. 1B is a partially enlarged cross-sectional view of separation strips of the capacitor element. In FIG. 1A, (X) indicates a cathode area of the capacitor element, (Y) indicates a separation strips area and (Z) indicates an anode lead out area.

The cathode area (X) of the capacitor element is formed of a roughened surface layer 1, which is prepared by roughening an aluminum foil electrochemically, a dielectric oxide layer 2 formed on a surface of the roughened surface layer 1, a solid electrolyte layer 3 formed on the dielectric oxide layer 2, a carbon layer 4 formed on the solid electrolyte layer 3 and a silver paint layer 5 formed on the carbon layer 4.

The separation strips area (Y) is formed of a first separation strip 6, which is located on a part of roughened surface layer 1 on an aluminum foil and has a smaller surface area in comparison with the surface area of the roughened surface layer 1, a second separation strip 7, which is located on a part of the first separation strip 6 and has a much smaller surface area than the first separation strip 6, and insulating material 8 applied onto a surface of the first separation strip 6 and the second separation strip 7. Insulating material 8 is applied onto the first separation strip 6 so as to have the width thereof the same as or less than the width of the first separation strip 6.

In the foregoing arrangement, making a "smaller surface area" of roughened surface layer 1 means to reduce a porous portion of an aluminum foil created by the surface roughening treatment by such steps as compressing, cutting, melting and the like method applied to the porous portion.

Next, a description is given to the specific methods for producing respective parts that constitute the capacitor element. First, an aluminum foil of 3 mm by 4 mm is subjected to an electrochemical etching process, to be formed a roughened surface layer on the aluminum foil.

Then, a dielectric oxide layer layer 2 is formed on a surface of the roughened surface layer 1 of the aluminum foil by performing anodation using a 0.3% ammonium dihydrogen phosphate aqueous solution under conditions of an applied voltage of 12 V, solution temperature of 70° C. and period of 30 minutes.

First separation strip 6 is then formed on a predetermined part of the aluminum foil, on which roughened surface layer 1 is formed, by compression by a pressing. The predetermined part is positioned between the cathode area (X) and the anode lead out area (Z). Further, a second separation strip 7 is formed on a part of the first separation strip 6 by another compression by a pressing. With these series of operation, most of the porous portions of the aluminum foil are compressed, thereby leaving virtually no porous portions on the part of second separation strip 7. Further, in the present exemplary embodiment, a heat resistant silicone adhesive is applied onto a surface of the first separation strip 6 to cover the second separation strip 7 and a heat resistant tape is attached onto the adhesive, thereby forming insulating material 8. Accordingly, the cathode area (X) and the anode lead out area (Z) are separated from each other by the first and the second separation strips 6 and 7, and also porous portions, which remain in a minimum amount, are blocked by the insulating material 8.

Further, a heat resistant tape with a heat resistant silicone adhesive coated thereon may be adhered on the separation strips 6 and 7 as the insulating material 8.

Then, after the cathode area (X) is immersed in a 30% manganese nitrate aqueous solution and subjected to air drying, followed by a heat treatment for decomposition at 300° C. for 10 minutes, thereby producing a manganese oxide layer that forms a part of the solid electrolyte layer 3.

Next, an aqueous solution containing 0.5 mol/liter pyrrole monomer and a 0.1 mol/liter sodium propylnaphthalene sulfonate is added with water, a solvent, and propyl phospheric acid ester acting as a pH controller to adjust pH of a polymerization solution for a solid electrolyte to be a pH value of 2. The cathode area (X) of the capacitor element is immersed in the polymerization solution and electrolytic oxidation polymerization takes place while an electrode for polymerization in contact with the surface of the cathode area (X), thereby producing a solid electrolyte layer 3 formed of a conductive polymer (polypyrrole).

Then, a colloidal carbon suspension is applied onto the surface of the solid electrolyte layer 3 and is dried, thereby producing a carbon layer 4. A silver paste is applied onto the carbon layer 4 and is dried, thus producing a capacitor element. The carbon layer 4 and the silver paste layer 5 together form a conductor layer to serve as a cathode lead out area.

Finally, a cathode lead is attached to the conductor layer of the capacitor element while an anode lead is attached to the anode lead out area, and then the capacitor element thus provided with the leads is encapsulated by an epoxy resin with part of respective lead terminals exposed outside, thus completing the production of an aluminum solid electrolytic capacitor.

Second Exemplary Embodiment

An aluminum solid electrolytic capacitor is prepared in the same manner as in the first exemplary embodiment except for producing second separation strip 7 by melting and solidifying the roughened surface of the aluminum foil by laser machining.

Third Exemplary Embodiment

An aluminum solid electrolytic capacitor is prepared in the same manner as in the first exemplary embodiment except for producing second separation strip 7 by removing the roughened surface layer of the aluminum foil by scraping to make the base material of the aluminum foil exposed outside.

Fourth Exemplary Embodiment

An aluminum solid electrolytic capacitor is prepared in the same manner as in the first exemplary embodiment except for using as insulating material 8 an insulating polymer paint applied onto the surfaces of the first separation strip 6 and the second separation strip 7.

The insulating polymer paint used here is a paint prepared with a polyurethane resin serving as a main ingredient and this paint is applied by an ink jet method (using EXCEL170i supplied by VIDEOJET).

Fifth Exemplary Embodiment

An aluminum solid electrolytic capacitor is prepared in the same manner as in the first exemplary embodiment except for replacing the pyrrole monomer in the polymerization solution for forming a solid electrolyte with ethylene dioxythiophene monomer.

Sixth Exemplary Embodiment

An aluminum solid electrolytic capacitor is prepared in the same manner as in the first exemplary embodiment 1 except for replacing sodium propyl naphthalenesulfonate in the polymerization solution for forming a solid electrolyte with sodium dodecylbenzenesulfonate.

With the solid aluminum electrolytic capacitors thus prepared in the first through sixth exemplary embodiments and also with a prior art solid aluminum electrolytic capacitor, data on electrical characteristics and a yield in terms of leakage current, which are fundamental parameters for this kind of product, are measured and compared. The results are shown in Table 1. The rating of the capacitors is 6.3 V in working voltage and 47 $\mu$F. in capacity. Each respective value in Table 1 is an average of 200 samples.

TABLE 1

| | 120 Hz | | Leakage Current | Yield in terms of Leakage |
|---|---|---|---|---|
| | Capacitance ($\mu$F) | tan $\delta$ (%) | After 2 Minutes ($\mu$A) | Current (%) |
| Embodiment 1 | 46.8 | 1.2 | 0.097 | 97 |
| Embodiment 2 | 46.7 | 1.1 | 0.091 | 98 |
| Embodiment 3 | 46.8 | 1.3 | 0.095 | 97 |
| Embodiment 4 | 46.9 | 1.2 | 0.090 | 97 |
| Embodiment 5 | 47.1 | 1.2 | 0.082 | 98 |
| Embodiment 6 | 47.0 | 1.2 | 0.087 | 98 |
| Prior Art | 47.3 | 1.4 | 1.031 | 81 |

As clearly seen in Table 1, the aluminum solid electrolytic capacitors in the first through sixth exemplary embodiments of the present invention show almost the same fundamental electrical characteristics as the prior art aluminum solid electrolytic capacitor, but, regarding the yield in terms of leakage current, the aluminum solid electrolytic capacitors of the present invention show better results than the prior art capacitor.

In the first exemplary embodiment, the porous portions of the aluminum foil are compressed and sealed by the first separation strip 6 and the second separation strip 7 formed by compression by the pressing and also by the insulating material 8. This allows the leakage current to be suppressed to the lowest possible level since a cathode material path mainly formed by a polymerization solution and leading to the anode side is blocked, thereby establishing insulating resistance between the cathode and the anode.

In addition, as shown in the second and third exemplary embodiments, when the second separation strip 7 is formed by melting and solidifying by a laser processing or by removing the porous portions by scraping, the path from the cathode material to the anode side is similarly blocked. Accordingly, whatever methods are employed, provision of the first separation strip 6 and the second separation strip 7 contributes to improve the yield of aluminum solid electrolytic capacitors in terms of leakage current.

Furthermore, as is shown in the fourth exemplary embodiment, an insulating polymer paint is used as the insulating material 8 in place of a heat resistant tape and, upon drying and solidifying the insulating polymer paint, almost the same results with the heat resistant tape can be obtained. Although an ink jet method is employed to apply the paint in the foregoing description, other methods, such as a generally used paste applying method, a printing method, a spray method and the like can be used.

As seen from the results of the fifth and sixth exemplary embodiments, even when heterocyclic compounds as thiophene and the like are used instead of pyrrole as a material for conductive polymer, almost the same results as when pyrrole is used can be obtained.

Although the description in the foregoing exemplary embodiments is described based on the solid electrolyte layer 3 that is formed by the electrolytic oxidation polymerization, a chemical oxidation polymerization can be used also in forming the solid electrolyte layer 3.

In the foregoing exemplary embodiments, although aluminum is used as an example of a valve metal, a metal selected from the group of tantalum, niobium, zirconium and titanium, or a composite or an alloy thereof can be used.

As described above, a solid aluminum electrolytic capacitor of the present invention comprises a capacitor element that includes a cathode formed of a dielectric oxide layer, a solid electrolyte layer and a conductor layer formed on a part of the outer surface of an anode body formed of a valve metal. A roughened surface layer is formed on the surface of the valve metal by a roughening process, and an anode lead out area is provided on a remaining part of the outer surface of the anode body. The roughened surface layer has a first separation strip to divide the anode body into an anode lead out area and the cathode area, and a second separation strip. An insulating material is applied onto the surfaces of the first and the second separation strips. The first and the second separation strips together with the insulating material prevent a conductive polymer, which serves as the cathode material, from creeping into the anode lead out area, thereby allowing significant reduction in the possibilities of extending of the solid electrolyte layer to the anode lead out area, which may cause defective insulation or an electrical breakdown. Furthermore, the manufacturing method of the present invention does not involve any complex processes, thereby allowing solid electrolytic capacitors to be produced without worsening the good productivity that has been so far enjoyed.

What is claimed is:

1. A solid electrolytic capacitor comprising:
   (A) a capacitor element comprising:
      a dielectric oxide layer formed on a part of an outer surface of an anode body of a valve metal having a roughened surface layer thereon;
      a solid electrolyte layer formed on said dielectric oxide layer;
      a cathode formed of a conductor layer formed on said solid electrolyte layer; and
      an anode lead out area provided on a remaining part of the outer surface of said anode body;
   (B) lead terminals connected to the cathode and the anode lead out area of said capacitor element; and
   (C) a packaging resin encapsulating said capacitor element with parts of said lead terminals exposed outside,
   wherein (1) a first separation strip and a second separation strip are formed between said cathode and said anode lead out area and (2) an insulating material is disposed on the surfaces of said first and said second separation strips.

2. The solid electrolytic capacitor according to claim 1, wherein an area of said second separation strip is smaller than an area of said first separation strip.

3. The solid electrolytic capacitor according to claim 1, wherein said first separation strip is one of a compressed roughened surface layer and a melted and solidified roughened surface layer.

4. The solid electrolytic capacitor according to claim 1, wherein said second separation strip is one of a compressed first separation strip, a melted and solidified first separation strip and an exposed base material of said valve metal.

5. The solid electrolytic capacitor according to claim 1, wherein a width of said insulating material located between said cathode and said anode lead out area is equal to or smaller than a width of said first separation strip and larger than a width of said second separation strip.

6. The solid electrolytic capacitor according to claim 1, wherein said insulating material is one of a tape-like insulating material with an adhesive provided thereon and an insulating polymeric material.

7. The solid electrolytic capacitor according to claim 1, wherein said valve metal is at least one selected from a group consisting of aluminum, tantalum, niobium, zirconium and titanium, and a composite or an alloy thereof.

8. The solid electrolytic capacitor according to claim 1, wherein said valve metal is in a metal foil.

9. The solid electrolytic capacitor according to claim 1, wherein said solid electrolyte layer is one of polypyrrole, polythiophene and a derivative thereof.

* * * * *